March 7, 1950  E. R. SABAUT  2,499,782
FURNACE ELECTRODE WITH COOLING MEANS
Filed Oct. 9, 1947
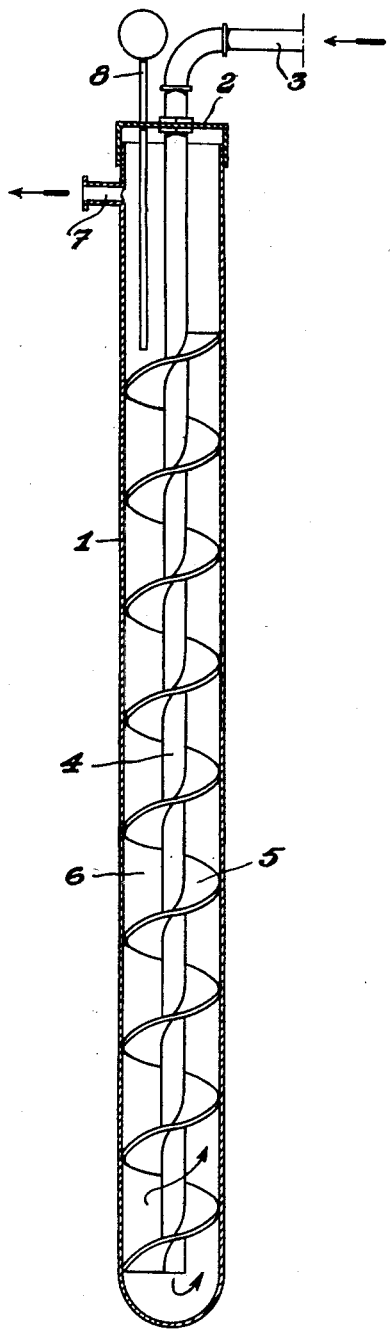
Inventor
EDMOND ROGER SABAUT
By Haseltine, Lake & Co.
Agents Patented Mar. 7, 1950

2,499,782

UNITED STATES PATENT OFFICE 2,499,782

FURNACE ELECTRODE WITH COOLING MEANS

Edmond Roger Sabaut, Brussels, Belgium, assignor to "Elfulux" Societe Anonyme-Holding, Luxemburg, Luxemburg Application October 9, 1947, Serial No. 778,988
In France October 10, 1946

3 Claims. (Cl. 13—18)

The present invention concerns an electrode for immersing in a mass to be heated acting as an electrical resistance, for example, an electrode for the melting of glass which becomes conductive of electricity when in the molten state.

Hitherto electrodes of this type were generally made of graphite and had the grave disadvantage of decomposing more or less rapidly, this being particularly unfavourable in the case of the melting of glass since the particles of graphite coming from the electrodes produce a colouration which was very harmful in glass.

The electrode according to the invention avoids these disadvantages by reason of the fact that it is formed of a hollow body of which the exterior wall, which is connected to a source of electric current, is formed at least partially of a material which is conductive of electricity, preferably metal, this body being provided interiorly with a system of cooling by fluid circulation, thus enabling the electrode to be maintained constantly at a temperature sufficiently low to avoid its premature deterioration. The system of cooling comprises means for extending the path of the cooling fluid along the conductive wall, which is in contact with the hot mass in which the electrode is immersed.

Other details and advantages of the subject of the invention will be seen from the following description of one example of construction thereof with reference to the accompanying drawing which shows in partial longitudinal section an electrode according to the invention.

In the example illustrated the electrode, properly speaking, is formed by a body 1, preferably of metal and having the form of a hollow prism or cylinder, the end of the said cylinder which is to be immersed in the mass to be heated being rounded, whilst the other extremity is closed by a cover 2 secured on the body 1. This assembly may be effected by welding, or the cover may be removably mounted for example by screwing on to the body of the electrode, with the interposition of a packing gland. The cooling fluid, which may be water or other liquid, or air or other suitable gas, that is to say, any suitable substance in the liquid or gaseous state, is led from a suitable source, (not illustrated) by a conduit 3 which is connected to the cover 2 and is also connected to a tube 4 which extends through the body 1 to its lower end. A helical vane 5 is applied on the outer wall of the tube 4 from its lower end to a certain distance from its upper end, preferably to just above the level of the maximum immersion of the electrode in the mass to be heated.

The exterior diameter of the vane 5 corresponds to the interior diameter of the hollow cylinder 1, and provides a continuous helical channel 6. The cooling fluid conducted by the pipe 3 passes directly to the base of the body 1 and rises along the passage provided by the channel 6 and leaves by a tubular outlet 7 provided on the said body, following the path indicated by the arrows.

A thermostat 8 controls the temperature of the cooling fluid at the outlet from the electrode and may be utilised automatically to control the means for circulating the fluid, so as to increase or reduce the speed of circulation as the said temperature exceeds a predetermined maximum or falls below a predetermined minimum.

Obviously, without departing from the spirit of the invention, various modifications may be made in the construction shown by way of example. Thus the body 1 may be in any suitable shape, rectilinear or not, whilst its transverse section may equally be modified as required. Also the cooling system may comprise distinct circuits for different cooling fluids so as to obtain a cooling in cascade. Equally, the direction of fluid circulation may be reversed, the fluid thus entering at 7 and leaving at 3, the thermostat in this case being mounted at the outlet of the tube 4. In the case of an electrode for the melting of glass, which constitutes a particularly interesting application, the arrangement shown is, however, preferably for an electrode introduced through the top of the melting furnace since the temperature of the tank or glass being melted is lowest at the surface of the tank and it is therefore convenient to carry out the cooling most strongly at the lower end of the electrode.

The tube 4 and the vane 5 may be of metal although there is no objection to their being made of a non-metallic material which is conductive or non-conductive of electricity.

At any rate the provision of a vane or the like increases the speed of flow of the cooling fluid for a given quantity supplied and provides a regular cooling action all over the periphery of the electrode.

What I claim is:

1. An electrode for immersion in a mass to be heated acting as an electrical resistance, comprising a hollow body having an exterior wall at least partially formed of an electrically conductive material, a tube extending axially within said body and having one end opening in proximity to one end of said body, while its other end is located outside said body to be connected to a conduit for a cooling fluid, an opening provided in the wall of the said body at the opposite end thereof to be connected to a conduit for the cooling fluid and a helical vane arranged between the outer wall of said tube and the inner wall of said body in the path of movement of the fluid between said first mentioned end of said tube and said opening.

2. An electrode for immersion in a mass to be heated acting as an electrical resistance, comprising a hollow body having an exterior wall at least partially formed of an electrically conductive material, a tube extending axially within said body and having one end opening in proximity to one end of said body, while its other end is located outside said body to be connected to a conduit for a cooling fluid, an opening provided in the wall of the said body at the opposite end thereof to be connected to a conduit for the cooling fluid, and a helical vane arranged between the outer wall of said tube and the inner wall of said body, in the path of movement of the fluid between said first mentioned end of said tube and said opening and secured to said axially extending tube.

3. An electrode for immersion in a mass to be heated acting as an electrical resistance, comprising a hollow body having an exterior wall at least partially formed by an electrically conductive material and a plain inner wall, a removable tube extending axially within said body and having one end opening in proximity to one end of said body, the other end of the tube being located outside said body to be connected to a conduit for a cooling medium, an opening in the wall of the body at the opposite end thereof, to be connected to a conduit for the cooling medium, and a removable helical vane arranged between the body and the tube for guiding the cooling medium.

EDMOND ROGER SABAUT.

REFERENCES CITED

The following references are of record in the file of this patent:

UNITED STATES PATENTS

| Number | Name | Date |
|---|---|---|
| 896,429 | Becket | Aug. 18, 1908 |
| 906,081 | Steynis | Dec. 8, 1908 |
| 1,234,947 | Sperling | July 31, 1917 |
| 1,271,093 | Snyder | July 2, 1918 |
| 1,439,340 | St. Clair | Dec. 19, 1922 |
| 2,121,579 | Bahls | June 21, 1938 |
| 2,234,476 | Jessop | Mar. 11, 1941 |
| 2,290,961 | Heuer | July 28, 1942 |
| 2,370,467 | Hopkins | Feb. 27, 1945 |